United States Patent

Worthington

[11] Patent Number: 5,476,281
[45] Date of Patent: Dec. 19, 1995

[54] LOCKING DEVICE FOR TRAILER HITCH

[76] Inventor: George Worthington, 2705 S. Maple, Sand Springs, Okla. 74063

[21] Appl. No.: 432,570
[22] Filed: May 1, 1995
[51] Int. Cl.[6] ............................. B60D 1/58; B60D 1/28
[52] U.S. Cl. ......................................... 280/507; 280/432
[58] Field of Search ................................ 280/504, 507, 280/511, 512, 515, 432, 456.1, 457, 461.1; 70/258

[56] References Cited

U.S. PATENT DOCUMENTS

| | | | |
|---|---|---|---|
| 2,571,349 | 10/1951 | Eckles | 280/507 X |
| 4,428,596 | 1/1984 | Bell et al. | 280/507 |
| 4,459,832 | 7/1984 | Avrea et al. | 280/507 X |
| 4,577,884 | 3/1986 | Harris | 280/507 |
| 4,774,823 | 10/1988 | Callison | 280/507 X |
| 5,378,008 | 1/1995 | McCrossen | 180/507 |

FOREIGN PATENT DOCUMENTS 2271537  4/1994  United Kingdom ............... 280/507

Primary Examiner—Kevin T. Hurley
Attorney, Agent, or Firm—William S. Dorman

[57] ABSTRACT

A locking device for a trailer hitch of the type which is used to connect the rear end of a pickup truck with the forward end of a trailer, the trailer having an adapter arm connected with the forward end of the trailer and being provided with a socket for engaging a ball on the rear end of the pickup truck, the ball having a threaded portion which projects downwardly through a support plate and having a nut secured to the lower threaded portion of the ball, a locking plate pivotally connected to the adapter arm at a location between the ends of the arm, the locking plate being provided with a first hole whose diameter is larger than the outer diameter of the nut such that, when the locking plate is pivoted towards the support plate, the lower end of the ball and the nut will be received in the first hole and the locking plate can be adjacent the underside of the support plate, a locking chain having a first end and a second end, the first end of the locking plate being connected to the locking plate intermediate its ends, the locking chain extending up and around the adapter arm and connected at its second end to the locking plate.

5 Claims, 4 Drawing Sheets

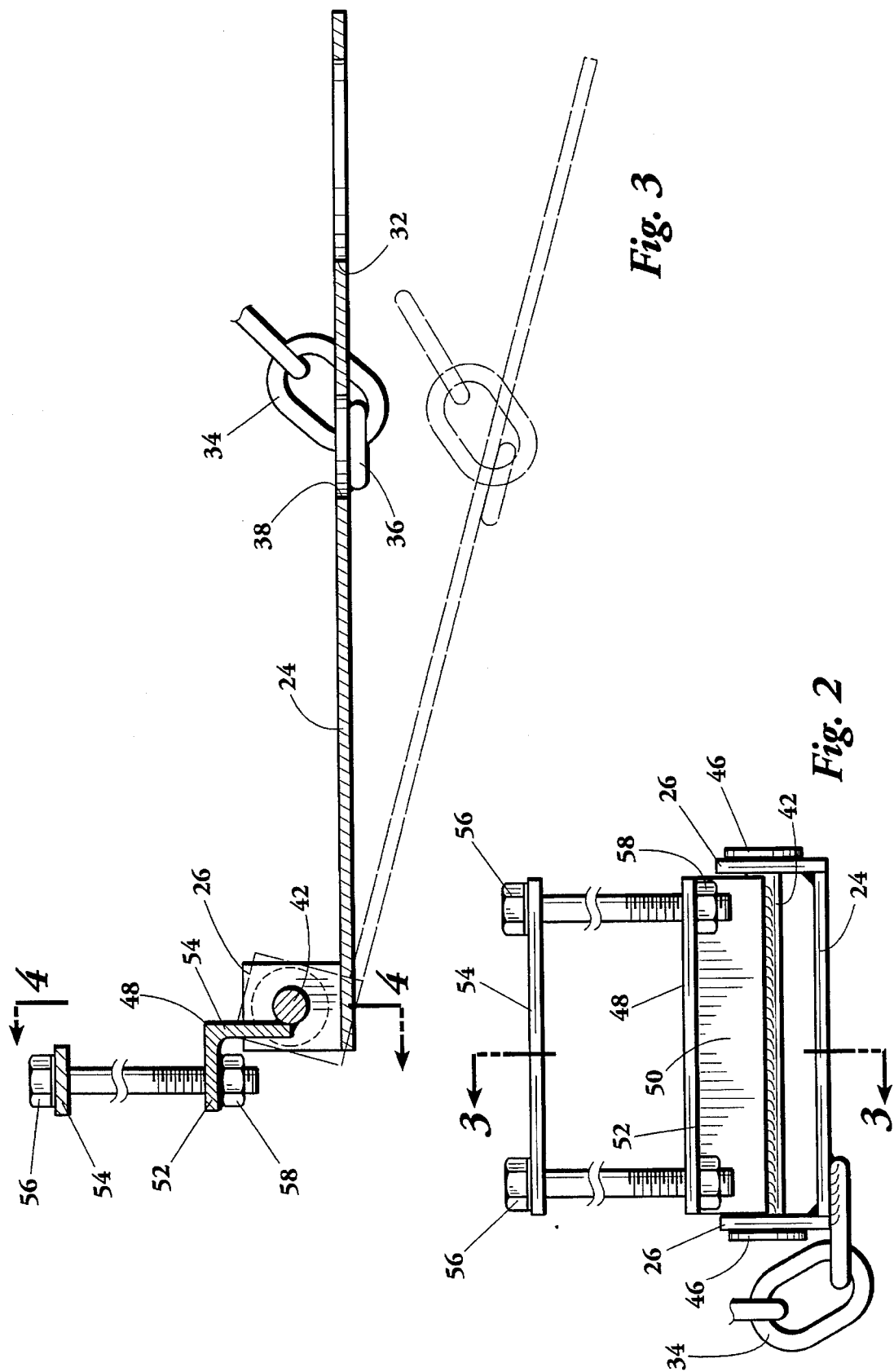

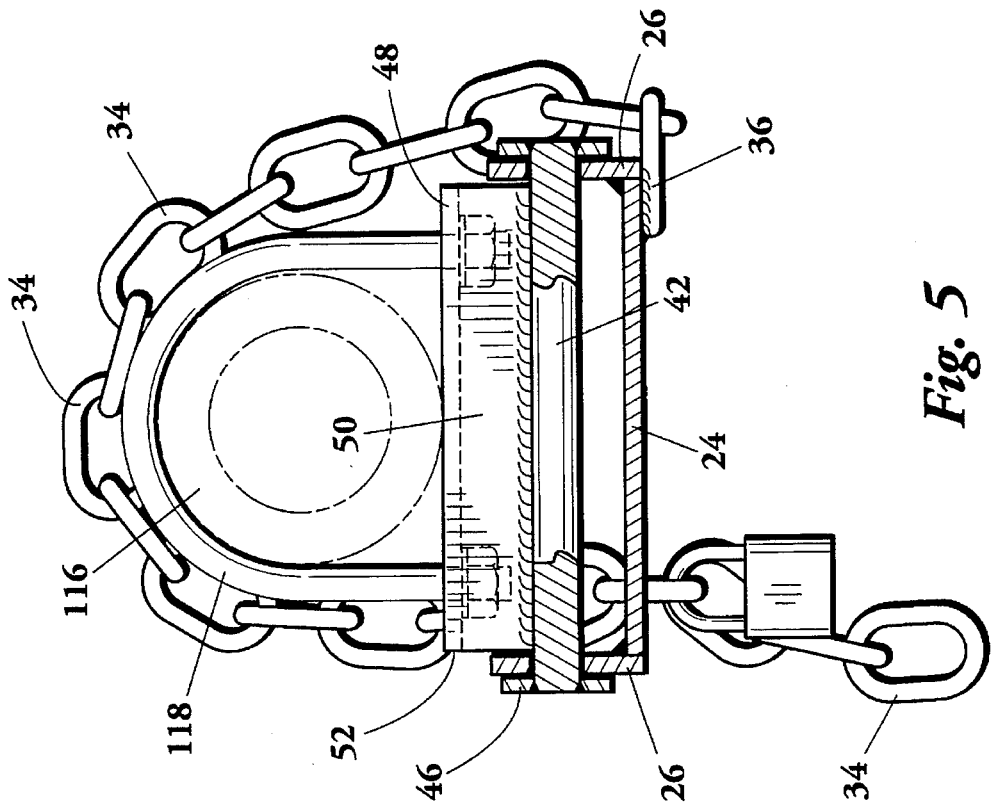
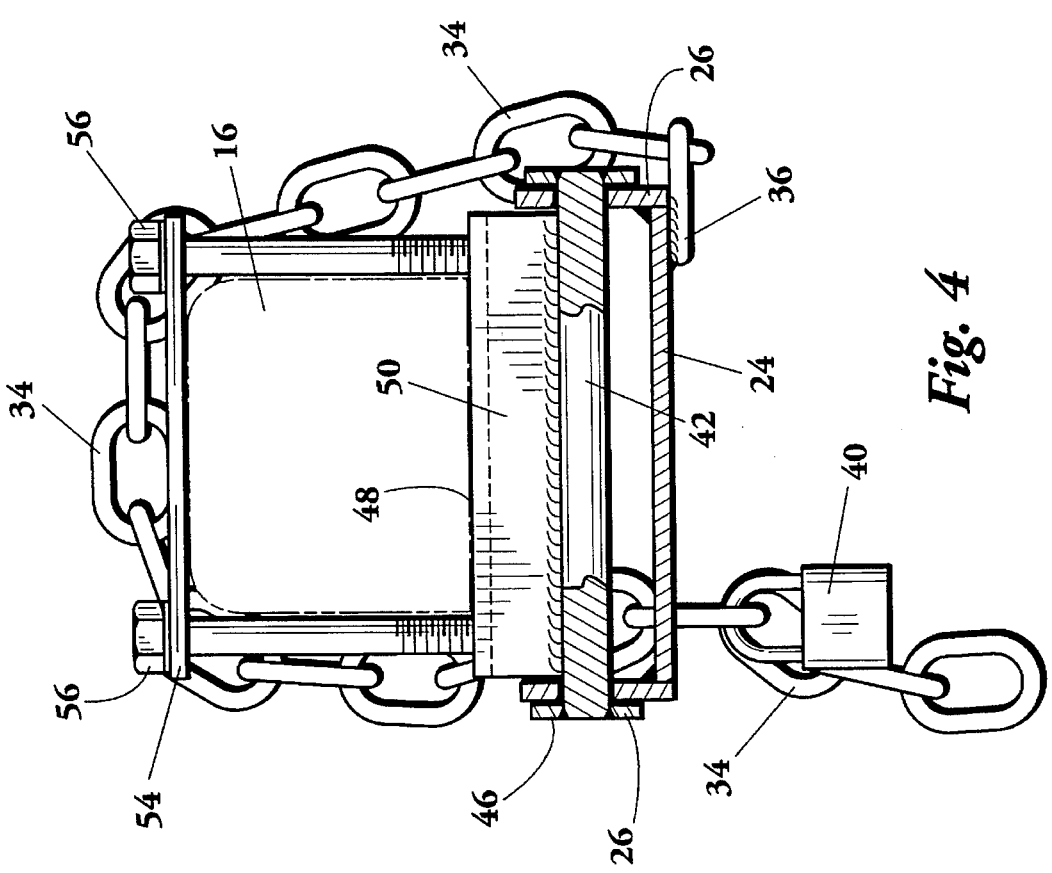

LOCKING DEVICE FOR TRAILER HITCH

BACKGROUND OF THE INVENTION

1. Field of the Invention

The present invention relates broadly to the type of hitch which is used to connect the end of a towing vehicle, such as a pickup truck, to the forward end of a towed vehicle, commonly referred to as a trailer. Normally the towing vehicle will have a ball on or adjacent a rear bumper of the towing vehicle, whereas the trailer will have a forwardly projecting arm which includes a socket that is capable of enveloping the ball on the towing vehicle. More particularly, the present invention relates to a locking device which cooperates with the arm and the structure on the towing vehicle associated with the ball for locking the arm into engagement with the ball.

2. The Prior Art

A preliminary search was conducted on the present invention and the following listed patents were uncovered in the search:

| Patent No. | Inventor | Issue Date |
|---|---|---|
| 2,571,349 | Eckles | 10-16-51 |
| 2,834,611 | Chenette | 05-13-58 |
| 4,082,311 | Hamman | 04-04-78 |
| 4,773,805 | Krahling | 09-27-88 |
| 4,958,847 | Williams | 09-25-90 |
| 5,072,964 | Schule | 12-17-91 |
| 5,154,440 | Dolan | 10-13-92 |
| 5,378,008 | McCrossen | 01-03-95 |

McCrossen U.S. Pat. No. 5,378,008 is described as having a "theft prevention feature". Plate 60, attached to tongue 11, has an opening 68 which surrounds a lock nut 25.

Dolan U.S. Pat. No. 5,154,440 shows a coupler lock 10 pivoted to a coupler 20.

Williams U.S. Pat. No. 4,958,847 shows a tow bar assembly which includes coupling chains and which also shows a locking cable 132 in FIG. 21.

Krahling U.S. Pat. No. 4,773,805 shows a safety coupling pin and a chain 30.

Eckles U.S. Pat. No. 2,571,349 shows a pivoted member 28 in FIG. 4 with padlock 32.

Schule U.S. Pat. No. 5,072,964 shows a safety cable 6 with ball and socket.

Chenette U.S. Pat. No. 2,834,611 shows a pivoted arm 14 with a recess 15 for receiving a nut 8 attached to a ball 5. A removable pin 17 will hold the arm 14 in the position shown in FIG. 1.

Hamman U.S. Pat. No. 4,082,311 shows a pivoted lock plate 24 and padlock 62.

SUMMARY OF THE INVENTION

The present invention involves a locking device for a trailer hitch of the type which is used to connect the rear end of a pickup truck with the forward end of a trailer. The trailer in this particular instance is one which has an adapter arm whose rear end is connected with the forward end of the trailer. The arm also has a forward end which includes a socket for engaging a ball on the rear end of the pickup truck. The pickup truck, on the other hand, has a support plate on a rear portion of the pickup truck adjacent the bumper. The ball, referred to above, is connected to the support plate and is provided with a portion which projects downwardly through the support plate and a nut is secured to the lower threaded portion of the bail so as to firmly secure the ball to the support plate. A locking plate is provided which is pivotally connected to the adapter arm at a location between the ends of the arm. The plate is provided with a first hole adjacent an end of the locking plate opposite from the pivotal connection to the adapter arm. This first hole has a diameter larger than the outer diameter of the nut such that, when the locking plate is pivoted towards the support plate, the lower end of the ball and the nut will be received in the first hole and the locking plate can be adjacent the underside of the support plate. The locking plate is also provided with a locking chain having a first end and a second end. The first end of the locking plate is connected to the locking plate intermediate its ends by welding a link at one end of the locking chain to the locking plate. At a time when the adapter arm is positioned so that the socket is properly engaging the ball, the locking chain is brought up and around the adapter arm and downwardly through a second hole in the locking plate. The second hole has a diameter slightly larger than the diameter of the links of the chain. At this time, the locking plate is urged upwardly against the underside of the support plate and the link which is just protruding below the second hole is connected to a padlock for holding the locking plate in position adjacent the underside of the support plate.

BRIEF DESCRIPTION OF THE DRAWINGS

FIG. 2 is a rear sectional view taken along section line 2—2 of FIG. 1;

FIG. 3 is a cross-sectional view taken along section line 3—3 of FIG. 2 but showing only the locking plate with a dotted line lowered position of the same;

FIG. 4 is a sectional view taken along section line 4—4 of FIG. 3;

FIG. 5 is a sectional view similar to FIG. 4 but showing how the elements would appear if the square tube adapter on the towed vehicle was replaced with a round tube attachment;

DETAILED DESCRIPTION OF THE PREFERRED EMBODIMENTS

Figure 1:
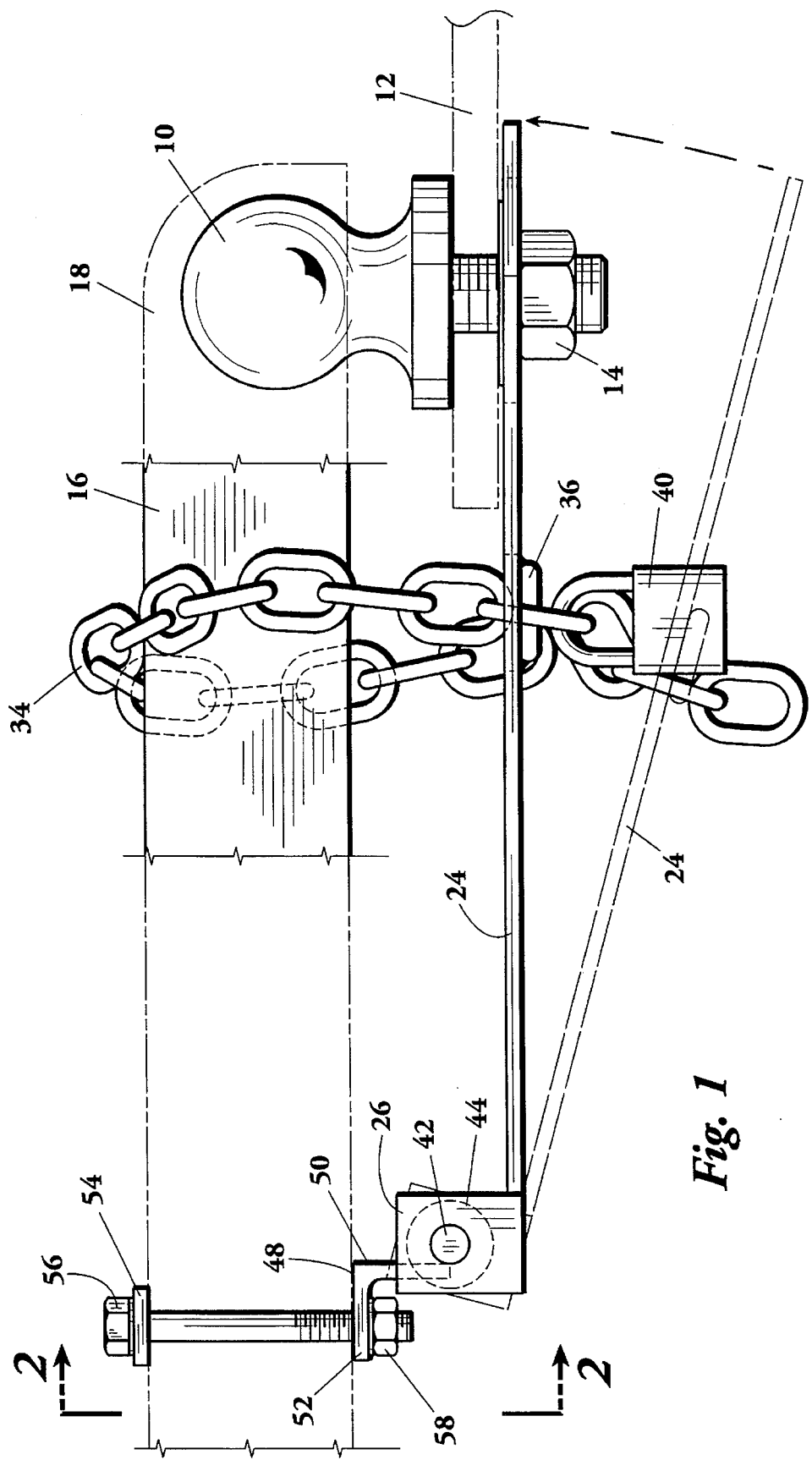
FIG. 1 is a side elevation of the locking device of the present invention showing the locking plate in relation to a ball on the rear end of the towing vehicle and also showing a portion of the adapter arm on the forward end of the towed vehicle.

Referring now to FIGS. 1, 2, 3, 4 and 6, the locking device of the present invention is used in connection with a conventional trailer hitch wherein a ball 10 is mounted on a support plate 12 or other convenient location on a towing vehicle (not shown), such as a pickup truck. The ball projects downwardly through the support plate and the lower end of the ball is held in position by a nut 14 which is tightened onto the threaded portion of the bail. The nut 14 may vary from 1¼" to 2" in diameter. The other portion of the conventional trailer hitch involves a tongue or arm 16 having a rear end (not shown) which connects with the front end of a trailer (not shown) or other towed vehicle; the arm 16 extends forwardly from the front end of the trailer towards the pickup truck. In the case of the embodiment shown in FIGS. 1 through 4 the arm 16 is a square tube adaptor as best shown in FIG. 4. The forward end of the arm 16 is provided with a conventional socket member 18 which engages and locks with the ball 10 in a conventional manner. The details of the socket member 18, therefore, are not shown.

The locking device of the present invention consists of an elongated metal locking plate or arm 24 having a pair of spaced ears 26 attached at one end. The ears 26 extend upwardly and are parallel to one another so as to provide a means for pivotally connecting the locking plate 24 to the arm 16 which projects forwardly from the trailer vehicle. As best shown in FIG. 4, the horizontal distance between ears 26 is greater than the horizontal width of the arm 16, for a purpose which will hereinafter appear.

There are a number of different ways in which the left-hand end of the locking plate 24 could be pivotally attached to the arm 16 and the manner in which this connection is shown in FIGS. 1 through 5 is merely illustrative of one type of pivotal connection. As shown in the drawings, a rod 42 extends through holes 44 in the ears 26 such that the ears 26 can pivot around the rod 42. The ends of the rod are provided with circular heads 46 which can be removably or permanently attached to the ends of the rod 42. An angle member 48 is provided having a vertical leg 50 and a horizontal leg 52. The rod 42 is welded adjacent the lower end of the vertical leg 50 of the angle member 48.

As best shown in FIG. 1, the horizontal leg 52 of the angle member 48 is adapted to underlie the lower surface of the attachment arm 16. As best shown in FIG. 4, the angle member 48 is wider than the horizontal width of the arm 16 and is provided with portions which extend beyond the sides of the arm 16; however, the horizontal dimension of the angle member 48 is slightly less than the distance between the ears 26. A short horizontal plate or bracket 54 is positioned on the upper surface of the arm 16 directly above the horizontal leg 52. The bracket 54 extends in a horizontal direction for a length greater than the horizontal width of the arm 16 as shown in FIG. 4 and is provided with outwardly extending portions which overlie the extending portions of the angle member 48. A pair of bolts 56 are adapted to pass through aligned holes in the bracket 54 and in the horizontal leg 52 of the angle member 48. A pair of nuts 58 are attached to the lower ends of the bolts 56 and can be tightened so as to snugly receive the angle member 48 against the underside of the arm 16. At this time, the locking plate 24 is pivotally connected to the arm attachment 16.

As indicated above, other methods could be employed to pivotally connect the locking plate 24 to the arm attachment 16; for example, a horizontal or transverse hole (not shown) could be made through the arm 16 adjacent the lower side thereof (in the general area where the ears 26 are shown in FIG. 1) and a bolt (not shown) could be passed through the holes 42 in the ears 26 and through this non-illustrated hole in the arm 16.

Figure 6:
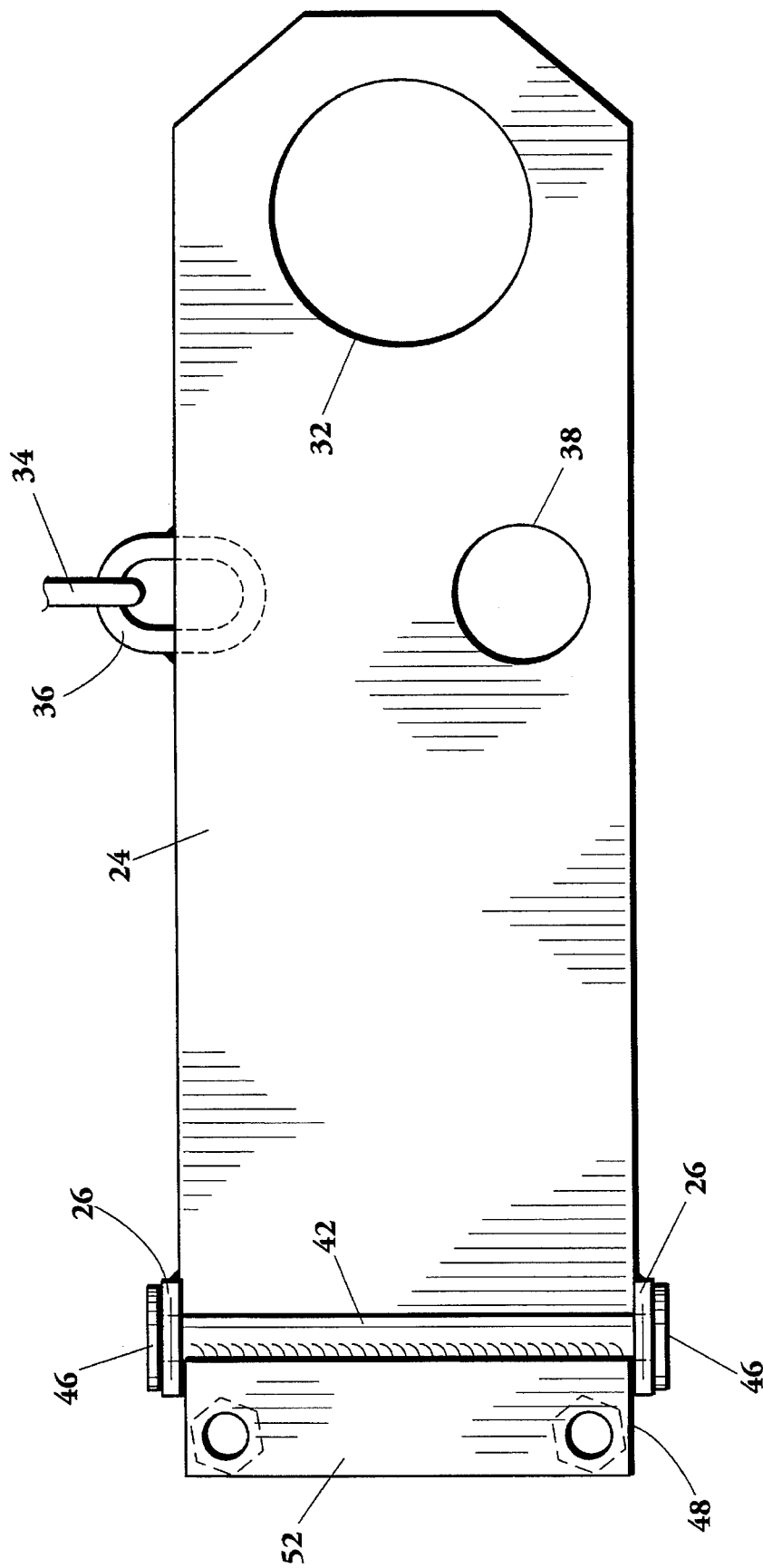
FIG. 6 is a plan view of the locking plate by itself.

As best shown in FIG. 6, a hole 32 is provided in the end of the locking plate 24 opposite from the ears 26. The hole 32 is slightly larger than the outer diameter of the nut 14. The locking plate 24 is also provided with a safety chain 34, one end of which is welded to the locking plate 24 by means of a link 36, for example, which is actually physically welded to the locking plate 24. The locking plate 24 is provided with a second hole 38 which is smaller in diameter than the hole 32, but which is slightly larger than the diameter of the links of the chain 34. This hole is located at the opposite side of the locking plate 24 from the welded connection 34 of the chain 34.

Turning again to FIG. 1, assuming that the towed vehicle is connected to the towing vehicle by properly attaching the arm attachment 16 of the towed vehicle to the ball 10 and assuming that the plate attachment 24 is in the dotted line position indicated, when the arm 24 is pivoted upwardly to the solid line position of FIG. 1 the hole 32 surrounds the nut 14 so that the locking plate 24 can be placed adjacent the bottom of the plate 12 on the towing vehicle. At this time, the chain 34 can be pulled up and around the arm 16 from the connecting point 36 and down through the hole 38. Now, when the chain 34 is pulled tight through the hole 38, the link which is just below the hole 38 is secured by means of a padlock 40. Depending upon the length of the chain 34 below the padlock 40, the lower end of the chain can be attached to the bumper (not shown) of the towing vehicle, for example, if desired.

FIG. 5 shows how the device of the present invention can be utilized where the attachment arm 16 is other than a square tube. For example, as shown in FIG. 5 the square attachment 16 has been replaced by a round tube 116 which connects with the towing vehicle in exactly the same manner as the attachment arm 16 and which is also provided with a socket connecting portion similar to the portion 18 on the arm 16. In order to attach the pivotal plate 24 to the round arm 116, an attachment U-bolt 118 is employed in lieu of the bolts 56 for the square attachment shown in FIG. 4. The lower ends of the U-bolt 118 are passed through the holes in the horizontal portion 52 of the angle member 48 and are provided with nuts such as the nuts 52 so as to snugly tighten the angle member 48 around the circular arm 116.

It is understood that the conventional equipment, i.e. conventional attachment of a towing vehicle to a trailer, for example, by means of a ball and socket arrangement, would normally include a pair of chains extending from the rear of the coupler to the towing vehicle. However, the present invention provides additional safety in that the ball is prevented from being disengaged from the socket. Furthermore, the present invention provides a method of preventing theft of the trailer when attached to the towing vehicle.

The device of the present invention can also be used to prevent theft of the trailer to some degree when it is no longer attached to the towing vehicle. For example, assume that the towing vehicle has been detached from the trailer by removing the padlock 40 and removing the chain 34 from its encircling position as shown in FIG. 1. After the socket portion 14 has been totally disengaged from the ball 10, then the pivotal locking plate can again be pivoted up towards the member 16, the chain 34 can again encircle the arm 16, the end of the chain 34 can be slipped through the hole 38 and the lock 40 can again be attached to the chain 34 as shown in the FIG. 1 position and even with the locking plate 24 closer to the arm 16 than shown in this Figure; it should be understood, of course, that the ball 10 and plate 12 are no longer in the picture. Under these circumstances, even though the trailer is no longer attached to the towing vehicle, it would be impossible if not extremely inconvenient for someone to try to attach the trailer to another towing vehicle because the locked position of the locking plate 24 against the arm 16 would prevent the easy insertion of another ball 10 into the socket portion 18 of the arm 16. Whereas the present invention has been described in relation to a towing vehicle, such as a pickup truck, which has a ball mounted thereon and a towed vehicle, such as a trailer, which has a socket mounted thereon, it should be understood that the reverse situation could exist; for example, the socket could be on the pickup truck and the ball could be on the trailer.

What is claimed is:

1. In combination with a trailer hitch for connecting a rear end of a towing vehicle with a forward end of a towed vehicle wherein the rear end of the towing vehicle is provided with a support plate with a ball mounted thereon, the ball having a lower threaded portion projecting through and below said plate and being secured thereto by a nut and wherein the towed vehicle has an arm having a rear end connected to the forward end of the towed vehicle, the arm having a forward end which is provided with a socket for engaging the ball on the towing vehicle, the improvement which comprises a pivotal locking plate having a rear end and a forward end, the rear end of said locking plate having pivotally connected to the arm at a location between the ends of the arm, said locking plate being pivotal towards said support plate, said locking plate having a first hole therein adjacent the forward end thereof, the first hole having a diameter larger than the outer diameter of said nut whereby when said locking plate pivots into position so as to be against the underside of said support plate, the lower end of the ball and the nut will project through the first hole in the locking plate, a locking chain having a first end and a second end, said locking chain being attached at its first end to said locking plate intermediate the ends thereof and being adapted to extend upwardly around said arm and back to said locking plate such that the other end of said chain can be secured to said locking plate to lock said locking plate in position against the underside of said support plate.

2. A locking device for a trailer hitch as set forth in claim 1 wherein said locking plate is provided with a second hole therein, said second hole being larger than the diameter of said chain whereby said chain can extend upwardly and around said arm with the other end of said chain extending through said second hole so that a padlock can be attached to a link of the chain which extends downwardly through said second hole.

3. A locking device for a trailer hitch as set forth in claim 1 wherein the rear end of said locking plate is provided with a pair of ears projecting vertically upward from said locking plate, a shaft extending through the ears of said locking plate such that said locking plate is rotatable relative to said shaft, an angle member having a horizontal length substantially equal to the distance between the two vertically projecting ears and being adapted to be received between the two ears, the angle member having a horizontal leg and a vertical leg, the vertical leg being welded along a lower edge thereof to said shaft and means for bolting the horizontal leg of said angle member to said arm.

4. A locking device for a trailer hitch as set forth in claim 3 wherein the arm is substantially rectangular in cross-section, wherein the horizontal leg of the angle member is adapted to underlie a bottom surface of the rectangular arm, wherein a horizontal bracket is adapted to overlie an upper surface of the rectangular arm opposite from the horizontal leg wherein the short plate and the horizontal leg of the angle member project outwardly from both sides of the arm and wherein bolts pass through the outer ends of the bracket and the outer ends of the horizontal leg of the angle member, the bolts being provided with nuts to securely fasten the angle member to the arm.

5. A locking device for a trailer hitch as set forth in claim 3 wherein the arm is circular in cross-section and wherein a U-bolt is adapted to surround the circular arm and wherein the U-bolt is provided with a pair of lower ends which pass through spaced holes in the horizontal leg of the angle member, the lower ends of the U-bolt being provided with nuts whereby the horizontal leg of the angle member can be tightened against the arm.

* * * * *